US008650297B2

(12) United States Patent
Doshi et al.

(10) Patent No.: US 8,650,297 B2
(45) Date of Patent: Feb. 11, 2014

(54) UNIFIED USER INTERFACE FOR NETWORK MANAGEMENT SYSTEMS

(75) Inventors: Bhautik Doshi, Fremont, CA (US); Richard Smith, Pacific Grove, CA (US)

(73) Assignee: Cisco Technology, Inc., San Jose, CA (US)

(*) Notice: Subject to any disclaimer, the term of this patent is extended or adjusted under 35 U.S.C. 154(b) by 1198 days.

(21) Appl. No.: 11/686,024

(22) Filed: Mar. 14, 2007

(65) Prior Publication Data

US 2008/0228919 A1 Sep. 18, 2008

(51) Int. Cl.
*G06F 15/173* (2006.01)
*G06F 15/16* (2006.01)

(52) U.S. Cl.
USPC ........... 709/226; 709/228; 709/224; 709/203; 709/218; 709/238

(58) Field of Classification Search
USPC .......................................................... 709/226
See application file for complete search history.

(56) References Cited

U.S. PATENT DOCUMENTS

| 7,269,625 | B1 * | 9/2007 | Willhide et al. | 709/206 |
|---|---|---|---|---|
| 2001/0044893 | A1 * | 11/2001 | Skemer | 713/153 |
| 2003/0056002 | A1 * | 3/2003 | Trethewey | 709/238 |
| 2003/0233554 | A1 * | 12/2003 | Litai et al. | 713/182 |
| 2005/0273513 | A1 * | 12/2005 | Panasyuk et al. | 709/228 |
| 2006/0136377 | A1 * | 6/2006 | Patt-Shamir et al. | 707/3 |
| 2007/0124482 | A1 * | 5/2007 | Lee et al. | 709/228 |

OTHER PUBLICATIONS

Brinsfield, J.G., "Unified network management architecture (UNMA)," Communications, 1988. ICC '88. Digital Technology—Spanning the Universe. Conference Record., IEEE International Conference on , vol., no., pp. 1135-1141 vol. 2, Jun. 12-15, 1988 URL: http://ieeexplore.ieee.org/stamp/stamp.jsp?arnumber=13731 &isnumber=553.*
CAS 1 Architecture, XHTML, CSS, 2006.
CAS 2 Architecture, XHTML, CSS, 2006.
Mazurek, Drew, Protocol, Release Date: May 4, 2005; Yale University.

* cited by examiner

*Primary Examiner* — Noel Beharry
(74) *Attorney, Agent, or Firm* — Baker Botts L.L.P.

(57) ABSTRACT

A network management system. In particular implementations, a method includes establishing a persistent session with one or more network management servers, where each persistent session is identified relative to a session identifier; authenticating one or more clients requesting access; receiving, from a client, a request to access a selected network management server of the one or more network management servers; generating a ticket for the client; and transmitting a redirection message to the client, where the redirection message identifies the selected network management server and includes the ticket and the session identifier corresponding to the selected network management server.

18 Claims, 12 Drawing Sheets

UNIFIED USER INTERFACE FOR NETWORK MANAGEMENT SYSTEMS

TECHNICAL FIELD

This disclosure relates generally to network management systems.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. To manage a large wireless network, network management systems (NMSs) may be used where each NMS may map sections of the wireless network and provide information regarding various network elements such as wireless access points, central controllers, etc. Typically, a network administrator logs in to each individual NMS directly to access detailed management functionalities of each NMS.

DESCRIPTION OF EXAMPLE EMBODIMENTS

A. Overview

Particular implementations facilitate client access to one or more network management systems (NMSs) via a single user interface provided by a management portal. The client may access one or more of the network management systems in connection with various management operations (e.g., monitoring, configuring, fault-management, etc.) in a large network via the management portal. After the client establishes a current session with the management portal, the client may then securely access the one or more NMSs seamlessly without having to sign on to each individual NMS.

According to one particular implementation, the management portal maintains a persistent session with one or more NMSs, where each persistent session is identified with a session identifier (session ID). In one implementation, the management portal periodically retrieves summary NMS data from each of the NMSs over the respective persistent sessions. The summary NMS data may include, for example, the status of various network infrastructure nodes (e.g., controllers, access points, etc.) that the NMS manages in the network. The management portal indexes pages of the managed NMSs in a management portal home page, which the client has access to after the client establishes a current session with the management portal. In one implementation, the client may access a NMS home page (or other page) by selecting an NMS from a page provided by the management portal. As describe in more detail below, on one implementation, when the client transmits a request for an NMS home page (or other page served by an NMS), the management portal redirects the client to the selected NMS; in one implementation, the redirection message transmitted to the client includes a ticket and the session ID that identifies the persistent session between the management portal and the selected NMS. When the NMS receives a request from the client resulting from the redirection message, the NMS validates the session ID and transmits the ticket to the management portal for validation. After validating the ticket, the management portal sends a validation message to the NMS. The NMS then generates a session ID for the client and sends the session ID and the requested page to the client. At this point, the client has access to the NMS via the NMS home page. In one implementation, the client may perform searches associated with one or more NMSs by sending search requests to the management portal. In one implementation, if the search involves multiple NMSs, the management portal may function as a proxy for the client and retrieve the search results on behalf of the client, and transmit a search results page including search results retrieved from multiple NMSs. In one implementation, if a user clicks on one of the links in the search results page, the client may be redirected by the management portal to the NMS identified in the selected result as above.

B. Example Wireless Network System Architecture

B.1. Network Topology

Figure 1:
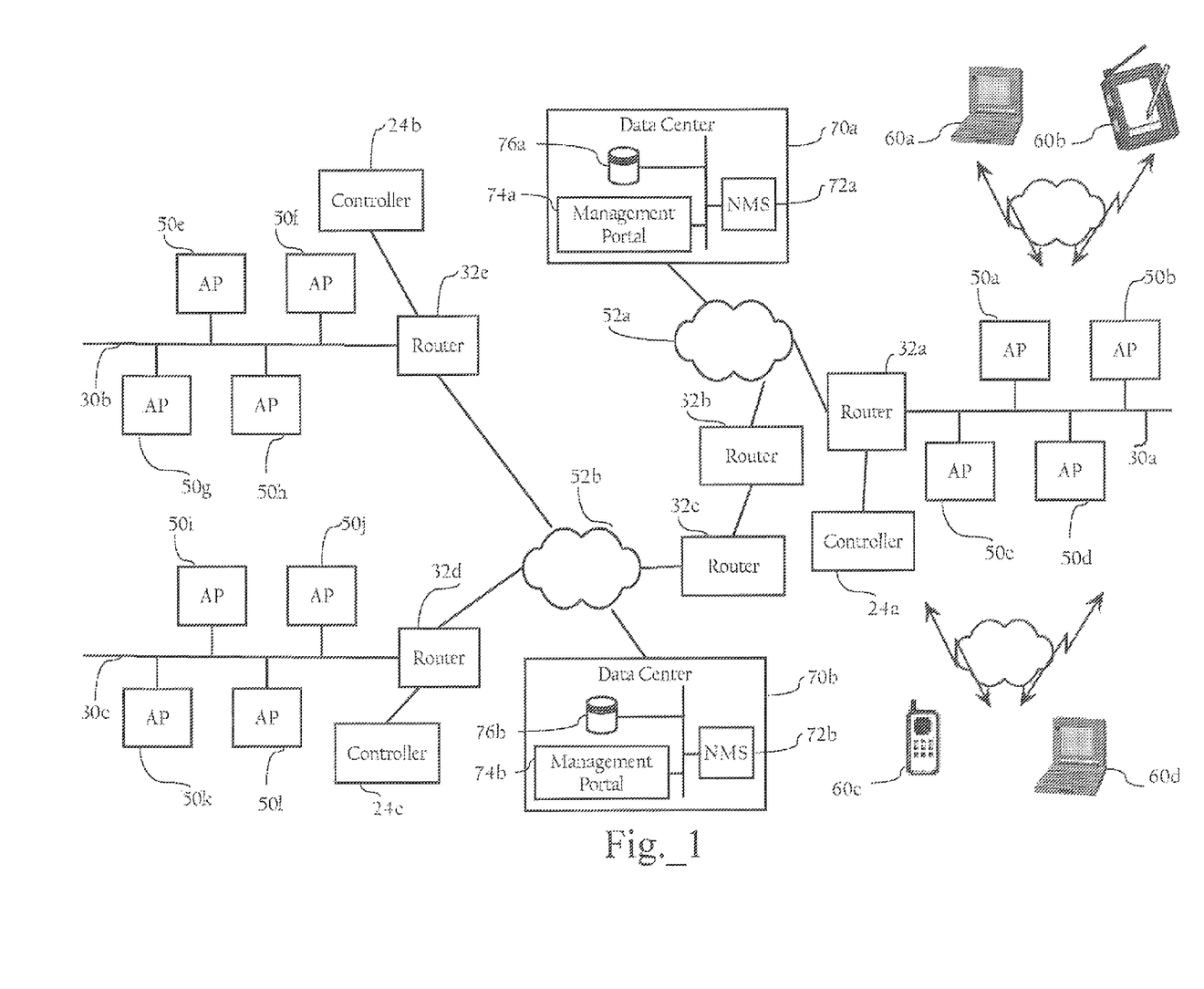
FIG. 1 illustrates example components in a wireless local area network (WLAN) system.

Although implementations of the invention can operate in a variety of network infrastructures, including wired and wireless networks, operation in connection with a wireless network is described for didactic purposes. FIG. 1 illustrates example components in a wireless local area network (WLAN) system. In a specific embodiment, the system includes controllers 24*a*, 24*b*, and 24*c*, local area networks (LANs) 30*a*, 30*b*, and 30*c*, routers 32*a*, 32*b*, 32*c*, 32*d*, and 32*e*, and wireless access points 50*a*, 50*b*, 50*c*, 50*d*, 50*e*, 50*f*, 50g, 50h, 50i, 50j, and 50k. LANs 30 are implemented by a switch (or an array of switches) and/or other network devices, such as bridges.

In one implementation, the WLAN system also includes data centers 70a and 70b, which include network management systems (NMSs) 72a and 72b, network management portals 74a and 74b, and data stores 76a and 76b, respectively. In one implementation, a management portal 74 may be a light-weight central network management server. In particular implementations, an NMS 72 may be a Wireless Control System (WCS), offered by Cisco Systems, Inc. of San Jose, Calif., operative to manage one or more elements of a wireless network infrastructure.

As FIG. 1 illustrates, these network elements are operably connected to networks 52a and 52b. Networks 52a, 52b, in one implementation, generally refer to computer networks, such as a LANs, a WANs, etc., that include one or more intermediate network devices (e.g., routers, switches, etc.), which allow for the transmission of messages between the management portals 74, NMSs 72, and clients via wireless access points 50. Of course, networks 52a, 52b can include a variety of network segments, transmission technologies and components, such as terrestrial WAN links, satellite links, optical fiber links, and cellular links. Networks 52a, 52b may also be campus LANs. LANs 30 may be LANs, LAN segments implemented by Ethernet switches, or arrays of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although management portals 74 and NMSs 72 are illustrated as being on a different LAN or LAN segment, they may be co-located with wireless access points 50.

The wireless access points 50 are operative to wireless communicate with remote client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system.

Figure 2:
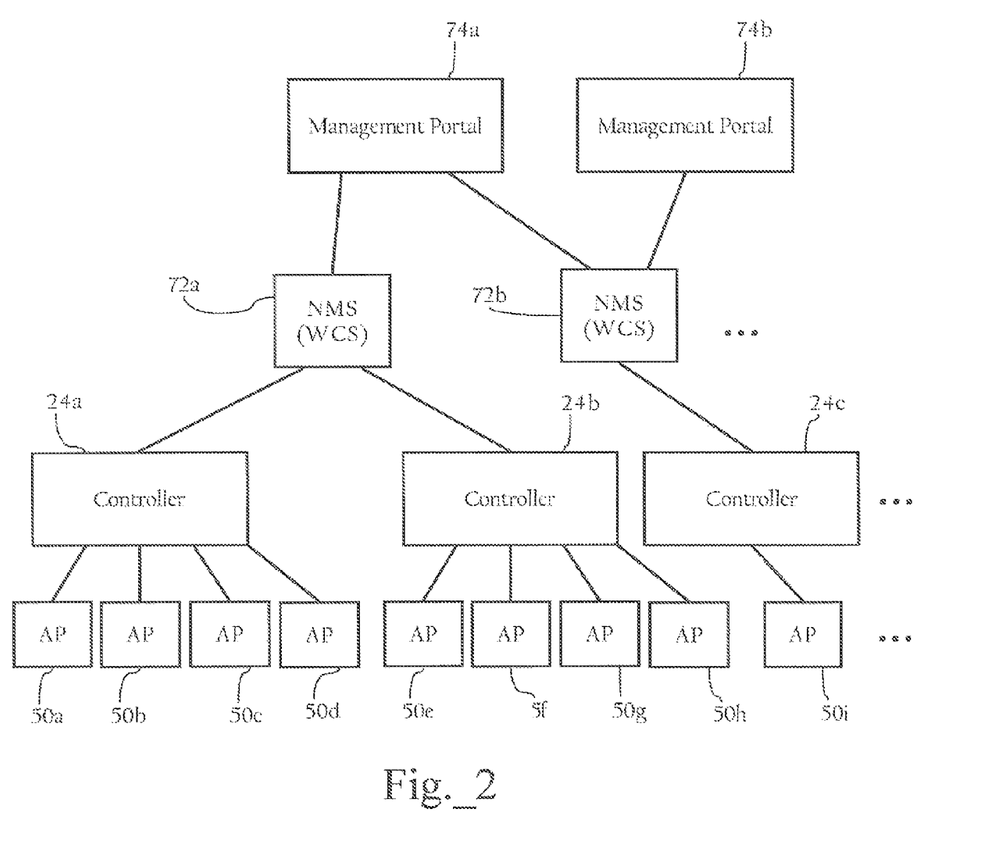
FIG. 2 illustrates example hierarchical relationships among various wireless network elements in accordance with one implementation.

FIG. 2 illustrates example hierarchical relationships among various wireless network elements in accordance with one implementation. As FIG. 2 shows, each management portal 74 manages one or more NMSs 72. A given NMS 72 may manage up to thousands of network elements, such as controllers 24 and wireless access points 50. An NMS 72 may perform a variety of management functions such as configuration, monitoring, fault management, etc. As described in more detail below, a user of a client may access one or more of the NMSs 72 directly or via the management portal 74. If via a management portal 74, the management portal 74 allows for seamless and secure access to one or more of the NMSs 72. In one implementation, each NMS is a stand-alone system and is operable to accept sessions directly with a client (e.g., without the client having to establish a session (e.g., log in to) a management portal 74. As such a given NMS server is responsible for authenticating the client.

B.2. Management Portal and Network Management System

Figure 3:
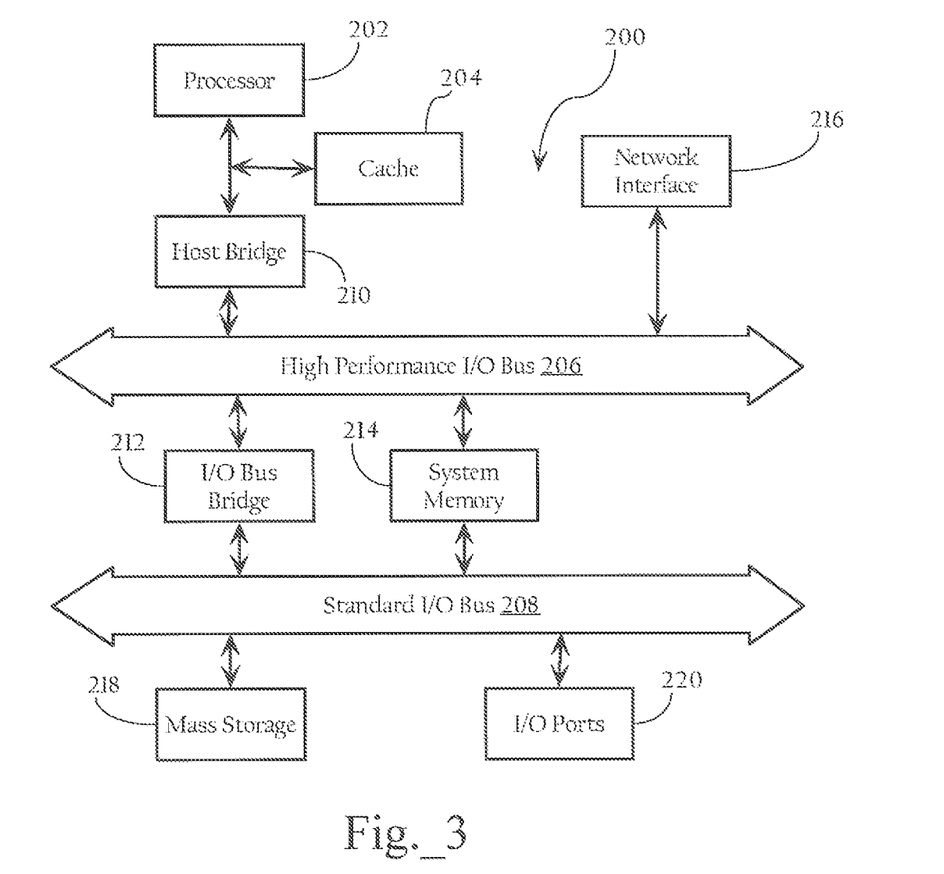
FIG. 3 illustrates an example hardware system, which may be used to implement a management portal or network management system.

FIG. 3 illustrates an example hardware system, which may be used to host one or more software modules that implement a management portal 74 and/or an NMS 72. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the management portal 74 and NMSs 72 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the apple Macintosh Operating System, available from Apple Computer Inc. of Cupertino, Calif., UNIX operating systems, LINUX operating systems, and the like.

C. Example Operation of Management Portal and NMS

Figure 4:
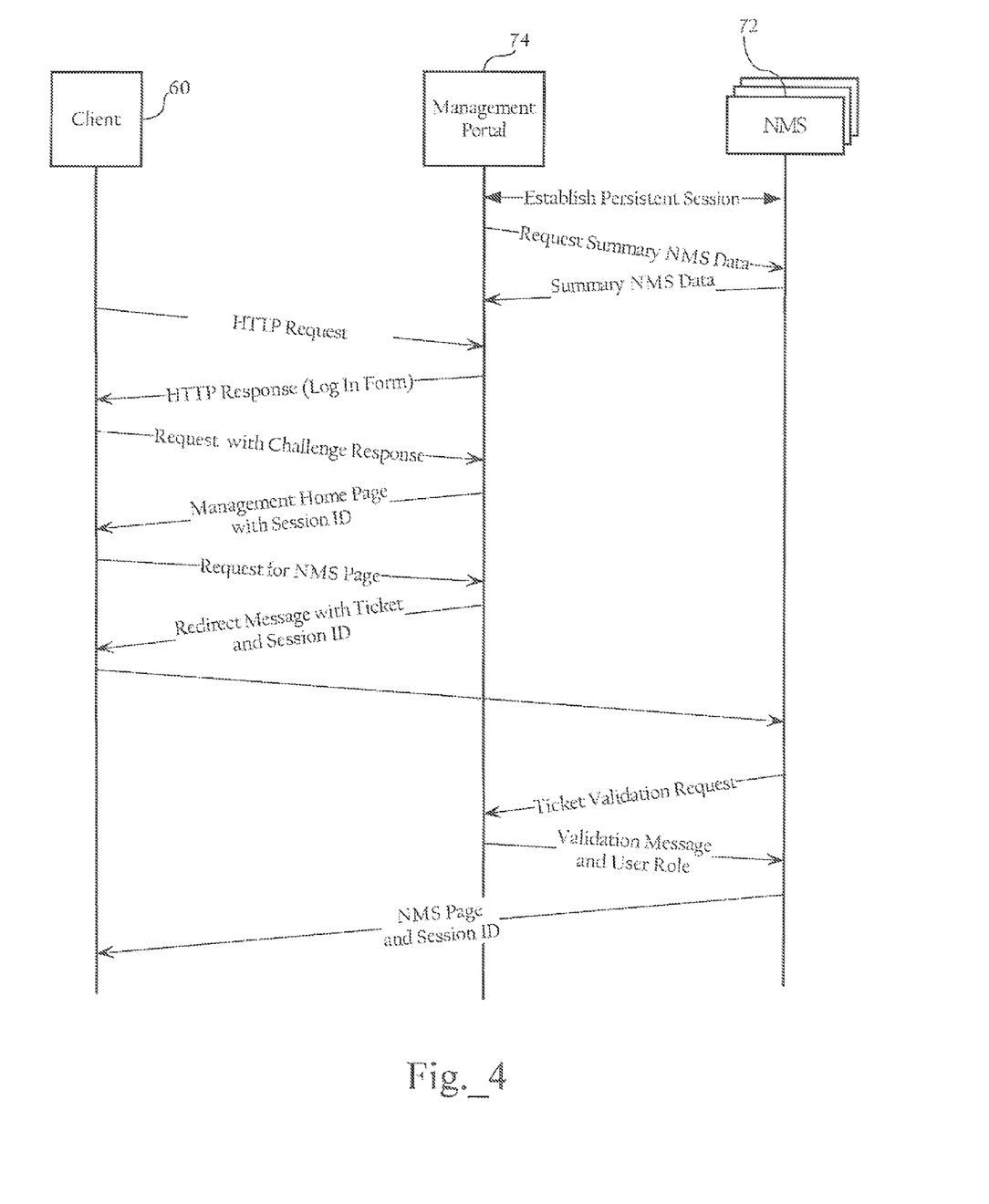
FIG. 4 is a diagram illustrating an example information flow among a client, a management portal, and one or more NMSs, and is directed to establishing a session between the management portal and the NMS and redirecting the client to the NMS.

FIG. 4 is a diagram illustrating an example information flow among a client 60, a management portal 74, and one or more NMSs 72. In particular implementations, the management portal 74 and the one or more NMSs 72 maintain persistent sessions each identified by session IDs. As FIG. 4 illustrates, the management portal may selectively redirect the client to a particular NMS.

As FIG. 4 shows, the management portal 74 establishes a persistent session with one or more MNSs that the management portal 74, with which it has been configured to interact. More specifically, in one implementation, the management portal 74 has a client function, where the management portal 74 prelogs into each NMS 72 using one or more credentials (e.g., IP address, username, password, etc.), authenticates with each NMS 72, and maintains a persistent session (e.g., an HTTP, SSL over HTTP, or HTTPS session) with each NMS 72. As discussed above, each persistent session is identified by a unique session ID. In one implementation, the management portal 74 performs keep-alive processes (e.g., every 5 minutes) to keep the current session from expiring. In one implementation, if the session is lost (e.g., times out), the management portal 74 may automatically log in to reestablish session connectivity. As described in more detail below in connection with FIG. 5, in one implementation, the management portal 74 also collects summary NMS data from each of the NMSs 72. As discussed below, this summary data can be presented to a user upon an initial log-in to the management portal 74.

C.1. Persistent Session Between Management Portal and NMSs

Figure 5:
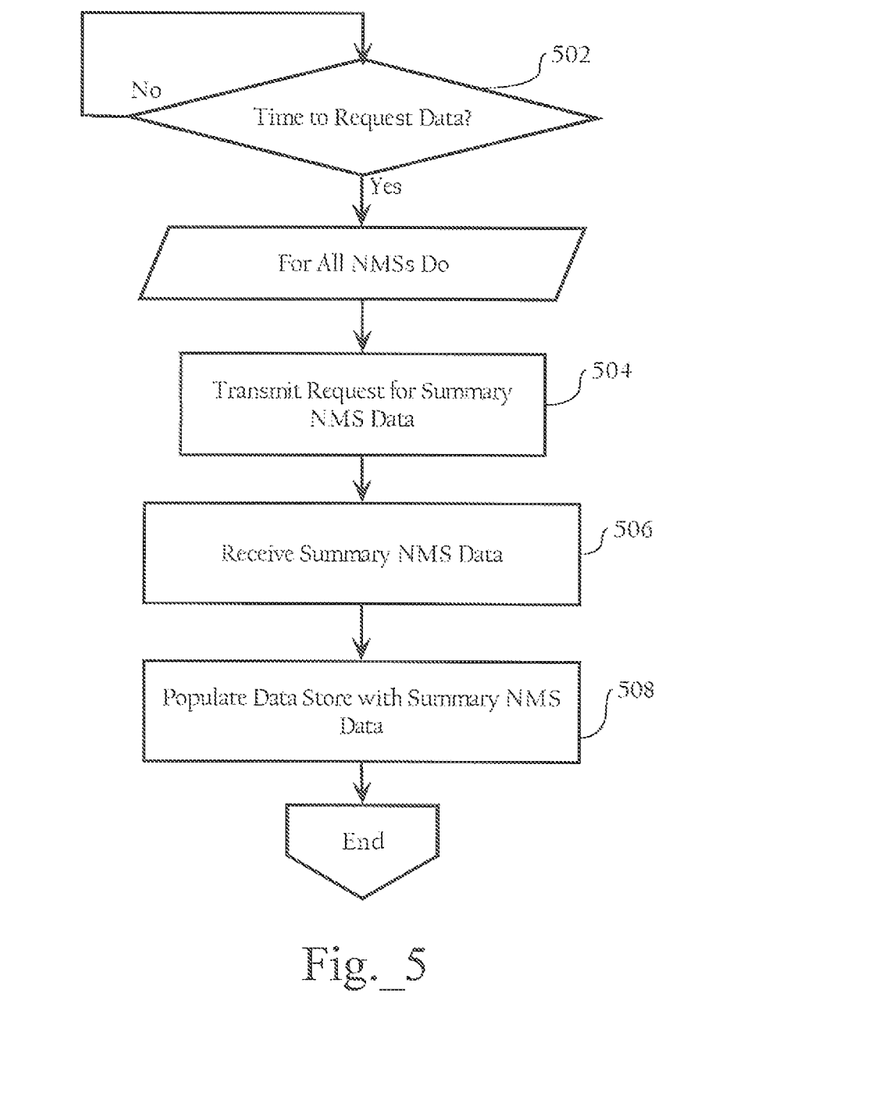
FIG. 5 illustrates an example method associated with collecting summary NMS data.

FIG. 5 illustrates an example method associated with collecting summary NMS data from one or more NMSs. Referring to both FIGS. 4 and 5, after a given time interval (e.g., every 5 minutes) (502), and for each NMS 72, the management portal 74 sends a request for summary NMS data to the NMS (504). In one implementation, the summary NMS data may include the current status of each NMS 72, alarms currently raised on any of the NMSs, and the like. In particular implementations, the management portal 74 collects the summary NMS data from all of the NMSs 72 at the same time (e.g., in separate processes) but may alternatively collect the summary NMS data at different times or serially in the same process. Upon receiving the summary NMS data (506), the management portal 74 populates or updates a data store 76 (e.g., a table) with summary NMS data (508).

C.2. Client Access to NMSs via Management Portal

As described in more detail below, after a client 60 logs in to the management portal 74, the client 60 may transparently access one or more NMSs 72 via the management portal 74 without having to log into the individual NMSs 72.

C.2.a. Client Login to Management Portal

Figure 6:
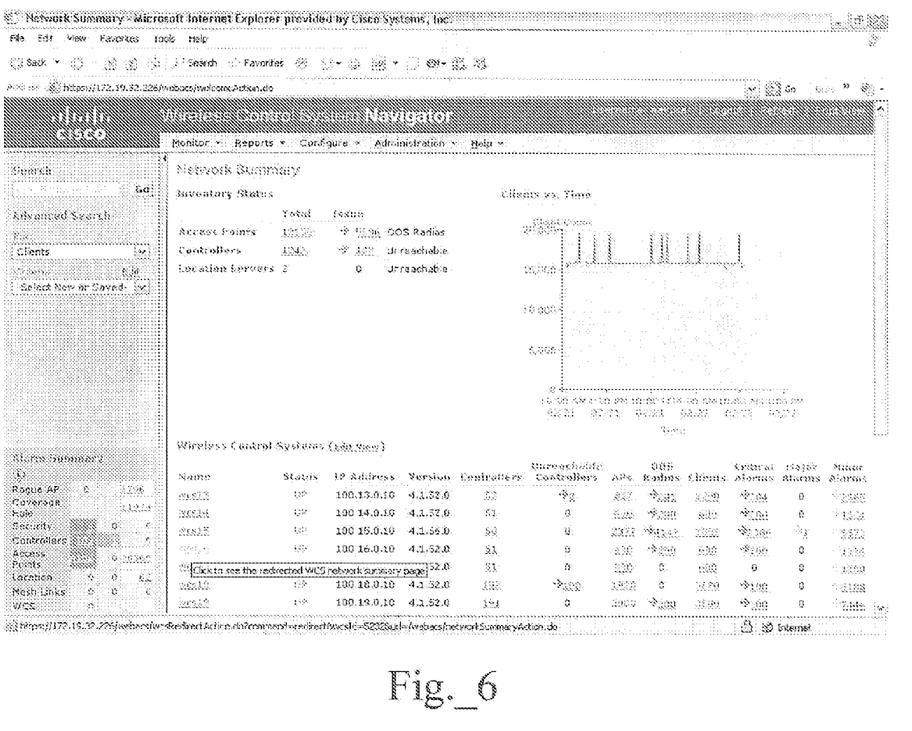
FIG. 6 illustrates an implementation of an example user interface showing a management home page.

Referring again to FIG. 4, the client 60 logs in to the management portal 74, in a particular implementation, by sending a HyperText Transfer Protocol (HTTP) request to the management portal 74, receiving an HTTP response (i.e., log-in form) from the management portal 74, and then sending a request with a challenge response (e.g., log in form completed with user credentials, such as user name and password) to the management portal 74. If the management portal 74 successfully authenticates the client 60, the management portal 74 creates a session ID for the client 60 and, in one implementation, sends a network management home page to the client 60. In one implementation, the management portal 74 may send the session ID in a browser cookie; in other implementations, management portal may use server-side session management and maintain the session ID internally until needed. FIG. 6 illustrates an implementation of an example user interface showing a management portal home page. As FIG. 6 shows, the management portal home page indexes pages from the NMSs 72 that the management portal 74 manages. The management portal home page, in a particular implementation, also displays the summary NMS data collected such as current status of the NMSs, alarms currently raised on any of the NMSs, etc.). In particular implementations, the pages provided by management portal 74 include hypertext links with URLs directed to the management portal 74, and including encoded parameters corresponding to respective NMSs. In one implementation, clicking on one of the links causes a browser hosted on client 60 to transmit a request to management portal 74, which responds with a redirection message, as described more fully below, that causes the client to access a selected network management server.

Figure 7A:
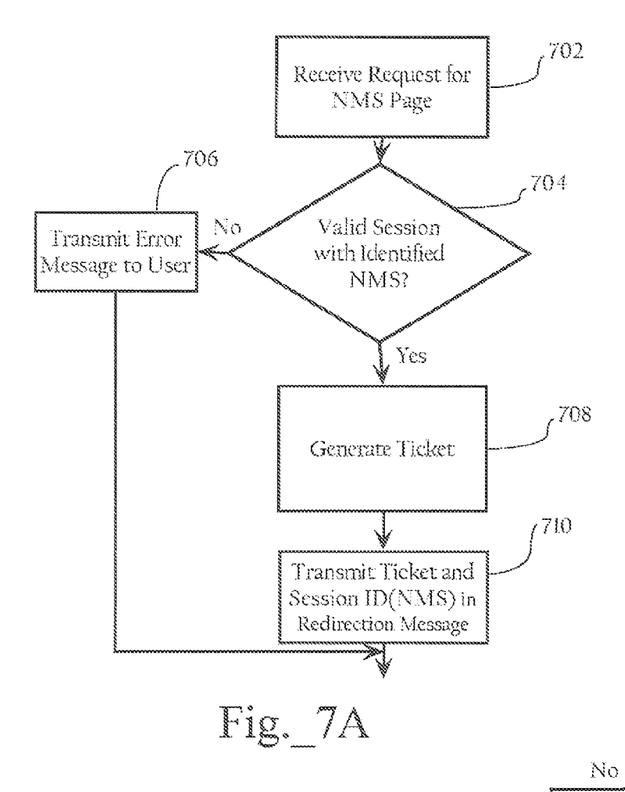
FIG. 7A illustrates an example method implemented at a management portal and associated with generating and transmitting a ticket.

In addition to tracking NMS related information, the management portal 74 may also track client information such as tickets, time stamps, client IP address, etc. As described in more detail below in connection with FIG. 7, such client information may be used to redirect a given client to a given NMS. Through the management home page, the user of the client may click on one of the listed NMSs to access the selected NMS. For example, from the management portal home page, the user may click on an NMS IP address (e.g., 100.13.0.10) to get redirected to an NMS home page.

C.2.b. Client Access to NMSs Using Redirection

FIG. 7A illustrates an example method implemented at a management portal and associated with generating and transmitting a ticket. Referring to both FIGS. 4 and 7, when the user of the client 60 selects an NMS 72 in the management home page or other page served by the management portal 74 (e.g., user clicks on a hypertext link to an NMS), the client 60 sends a request for the NMS home page to the management portal 74. In one implementation, the request may include a URL of the selected NMS 72 (e.g., 'https://wcs1/webacs/monitorMap.do?serviceDomainId=333'), where the URL functions as a query parameter. When the management portal 74 receives the request for the NMS home page (702) the management portal 74 may in some implementations verify that it has a valid session ID for the particular NMS 72 and that the NMS 72 is operating (704). If the management portal 74 does not have connectivity, it may notify the user with an error message (706). In one implementation, the user remains in the management portal user interface (UI) instead of getting a "page not found" error.

If the management portal 74 has a valid session with the NMS 72, the management portal 74 generates a ticket (708).

In one implementation, a ticket is a secured random number for the user. In one implementation, the management portal 74 stores the ticket in a hash value, and the hash value may have one or more of the following attributes: the IP address of the NMS, the user's management portal session ID, and a timestamp of ticket generation. In one implementation, the ticket may have an expiration time (e.g., 30 seconds). The management portal then transmits the ticket and session ID (NMS) in a redirect message (710) to redirect the user browser hosted on client 60 to the selected NMS 72. More specifically, in one implementation, the management portal 74 redirects the user browser to the appropriate URL through an http status code 302 with no-caching indicated in the http header field. The management portal 74 appends the redirect URL with one or more of the following additional parameters (in one implementation, as cgi parameters): ticket, session ID corresponding to selected NMS 72, and management portal address (e.g., https://wcs1/webacs/monitorMap.do?service DomainId=333&ticket=<randomNumber>&sessionId= <portalToWcsSessionId>&portalAddress=<portalIp Address>).

Figure 8:
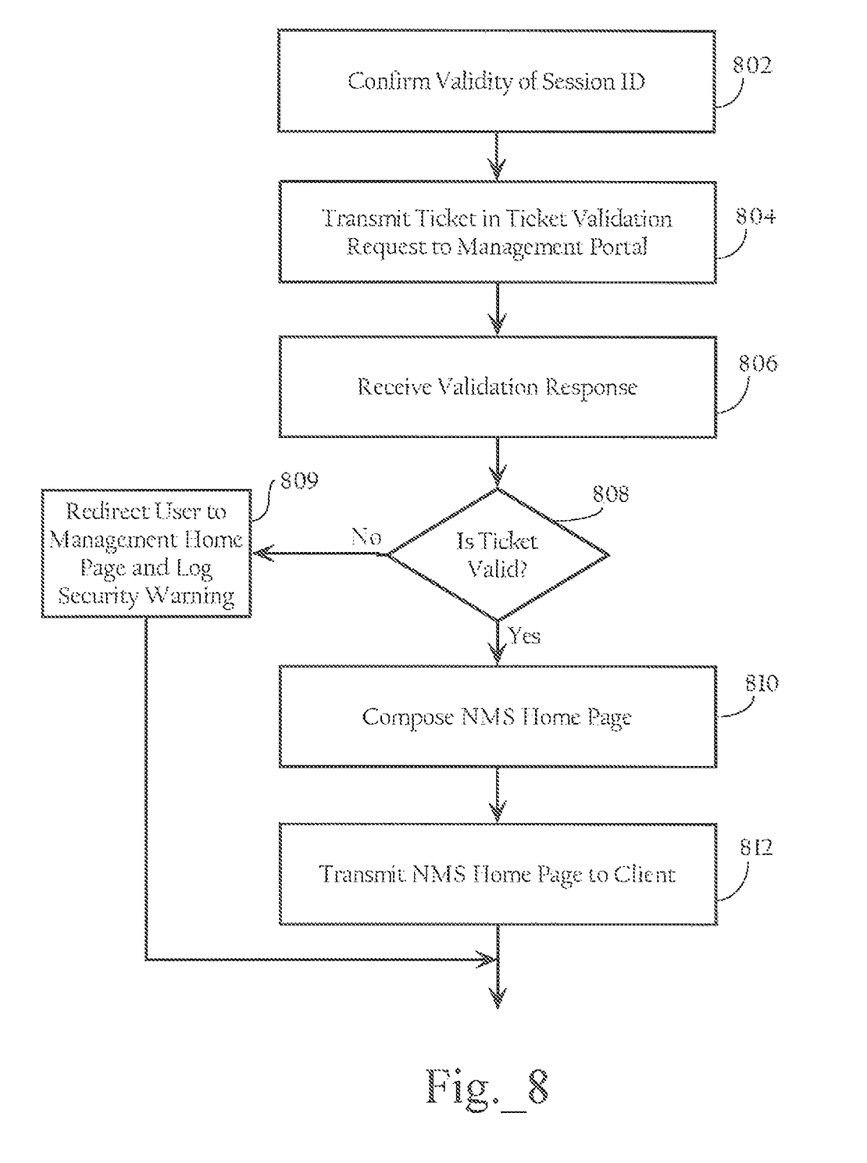
FIG. 8 illustrates an example method implemented at an NMS and associated with redirecting a client to the NMS.

FIG. 8 illustrates an example method implemented at an NMS and associated with the single-sign on functionality described herein. Referring to both FIGS. 4 and 8, when the NMS 72 receives the request for the NMS home page from the client 60, the NMS 72 looks up a session ID of the management portal 74 to confirm that the session ID is currently valid (802). In one implementation, an authentication filter validates whether the portal session ID is still valid by looking up the session ID in a hash that it maintains. The authentication filter then looks up the management portal address from the hash and compares it with the IP address received. This ensures that that the redirect URL actually came from a valid management portal that is already logged in to the NMS 72.

In one implementation, the NMS 72 may utilize an authentication filter (e.g., a tomcat authentication filter) to determine if there is already an on-going valid session with the client. If not, the authentication filter may determine if the URL request has as request parameters, a ticket, session ID of the management portal 74, and a management portal address. This confirms whether the URL request came from the management portal redirect.

The NMS 72 sends a ticket to the management portal 74 (804) so that the management portal 74 can validate the ticket for the user IP address. In one implementation, the validation may be performed using an Apache HTTP client API (e.g., https://portalIpAddr/webacs/ ticketValidationAction.do?ticket=<ticketFromReq Param>&userIpAddress=<userIpAddr>). In another implementation, the validation may be performed using a Simple Object Access Protocol (SOAP) application programming interface (API) to validate the ticket.

Figure 7B:
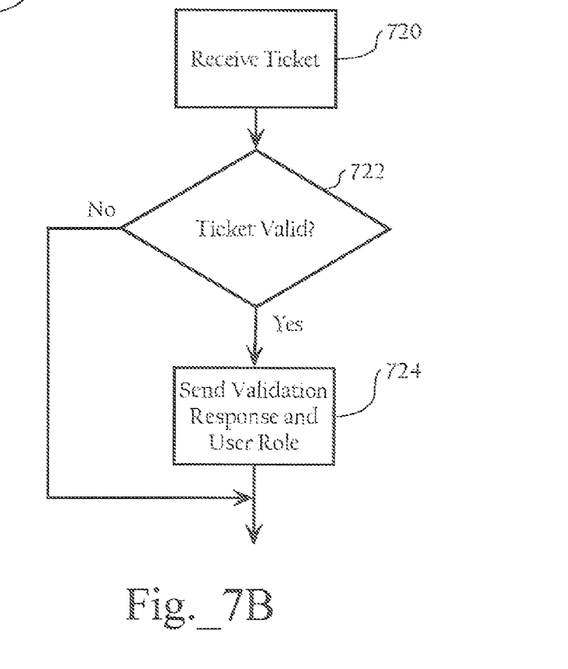
FIG. 7B illustrates an example method implemented at a management portal and associated with validating a ticket.

FIG. 7B illustrates an example method implemented at a management portal and associated with validating a ticket. As FIG. 7B shows, the management portal 74 receives a ticket validation request from the NMS 72 (720). The management portal 74 then determines if the ticket is valid (722). In one implementation, the management portal 74 makes the determination by matching the ticket to the ticket hash the management portal 74 maintains in a data store. In one implementation, if the ticket exists in the hash, the portal validates the user IP address as an extra validation. In one implementation, the management portal 74 may also determine whether the time stamp of the ticket is within some threshold time period. In one implementation, the ticket is for one-time use only and it becomes invalid immediately after its first use. The management portal 74 looks up the user role and sends a validation response and the user role (e.g., privilege set) to the NMS 72 (724). In one implementation, the validation response indicates whether the ticket validation passed or failed. In one implementation, the management portal 74 may also send to the NMS 72 one or more of the following information: a portal address by which user is accessing a portal (e.g., portal1, portal1.cisco.com or 10.1.1.1), a Secure Sockets Layer (SSL) certificate, an NMS name at the management portal, other NMSs that the portal manages, etc.

Referring again to FIG. 8, the NMS 72 receives the validation response from the management portal 74 (806) and, based on information in the validation response, determines whether the ticket is valid (808). In one implementation, if the ticket is invalid, the NMS 72 may redirect the user back (e.g., through HTTP 302) to the management home page and log a security warning (809). If the ticket is valid, the NMS 72 generates a session ID for the session between it and client 60. In one implementation, the NMS 72 sets the permissions it received from the management portal 74. This ensures that the user has the same type of role and permissions on the NMS 72 as the client 60 has on the management portal.

The NMS 72 then composes an NMS home page (810) and sends the NMS home page to the client 60 (812). In one implementation, the NMS 72 also includes a cookie with the NMS home page in order to keep track of a user in case the user session timeouts. If the user session were to time out, the NMS 72 may redirect the user browser back to the management portal login page instead of the NMS login page.

Figure 9:
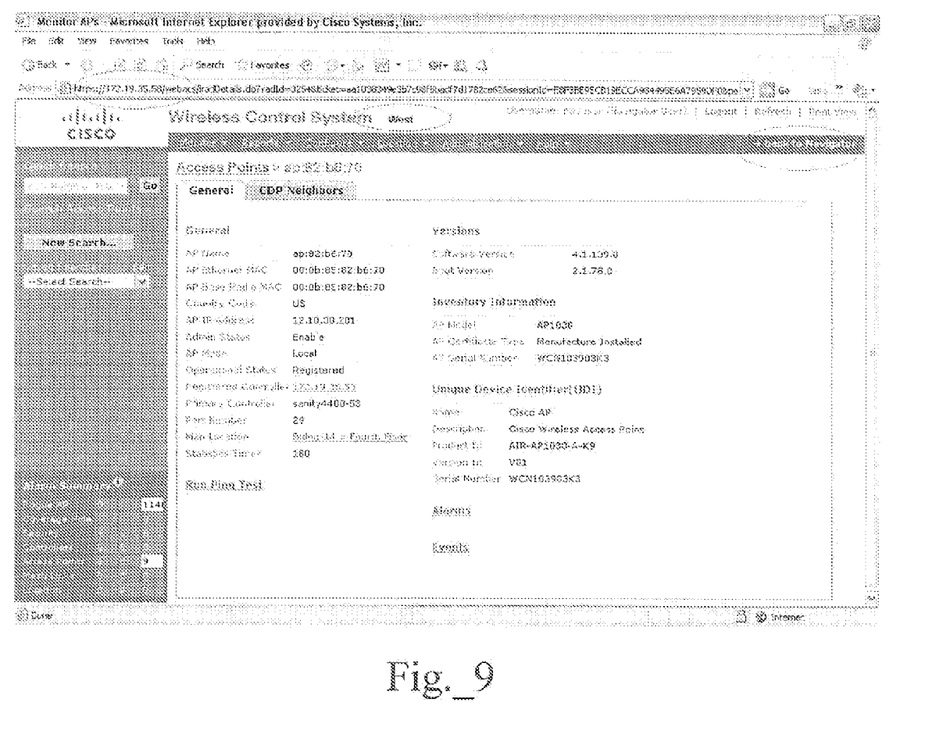
FIG. 9 illustrates an implementation of an example user interface showing an NMS home page.

FIG. 9 illustrates an implementation of an example user interface showing an NMS home page. Through this NMS home page, the user may obtain other NMS pages by clicking on the appropriate hypertext link. In one implementation, the user may return to the management portal home page by clicking on the appropriate link (e.g., "back to navigator" link) in the NMS home page. In one implementation, when the user is back at the management portal home page and if the user clicks on a given NMS hypertext link a second time, the steps described in connection with FIG. 7 above are repeated except that the NMS 72 will notice that the user is already logged in (by identifying a valid and unexpired session identifier) and would not attempt to validate the ticket and would ignore the ticket. After the ticket on the portal expires (e.g., after 30 seconds), the management portal removes the ticket from the ticket hash.

C.2.c. Management Portal Search and Proxy Functionality

In one implementation, the user may search for any network node (e.g., controller, wireless access point, client, rogue wireless access point, rogue client, location servers, tags, alarms, events, etc.) throughout the WLAN based on various search parameters. In one implementation, the management portal 74 performs an efficient, hierarchical, context-specific search and retrieves current information as requested by retrieving data stored at the management portal 74, data stored at the NMS 72, and/or data stored at location servers managed by the NMS 72. The data is retrieved and the search result shown in a list view on a search results page. Clicking on any displayed item, in one implementation, redirects the client to the corresponding NMS page with detailed information for the item fetched directly from a network node (such as a controller).

In one implementation, if the management portal 74 receives a search request for information associated with a given NMS 72 (e.g., an on-demand query), the management portal 74 redirects the client 60 to that NMS 72, as described above. In some particular implementations, the management portal may function as a proxy, and serves as a single point of entry for requests from the client browser. In some implementations, the management portal functions as proxy if the management portal receives a request from a given client for multiple nodes. When the user clicks on an NMS link (search item or main NMS link) in the user interface of the management portal home page, instead of performing a redirect, the management portal itself functions as a web client and posts the URL to the NMS 72. Accordingly, the response received from NMS 72 is then sent back to the browser by modifying the URLs so that any click on the NMS home page will be passed to the management portal 74 so that the management portal will make the request to the NMS 72.

When the management portal 74 performs one or more on-demand queries on behalf of the client 60, the management portal may perform multiple searches in a given session. In one implementation, the search results do not get saved in the database but are sent directly to the client 60 to be displayed in the user browser (e.g., management portal home page).

Figure 10:
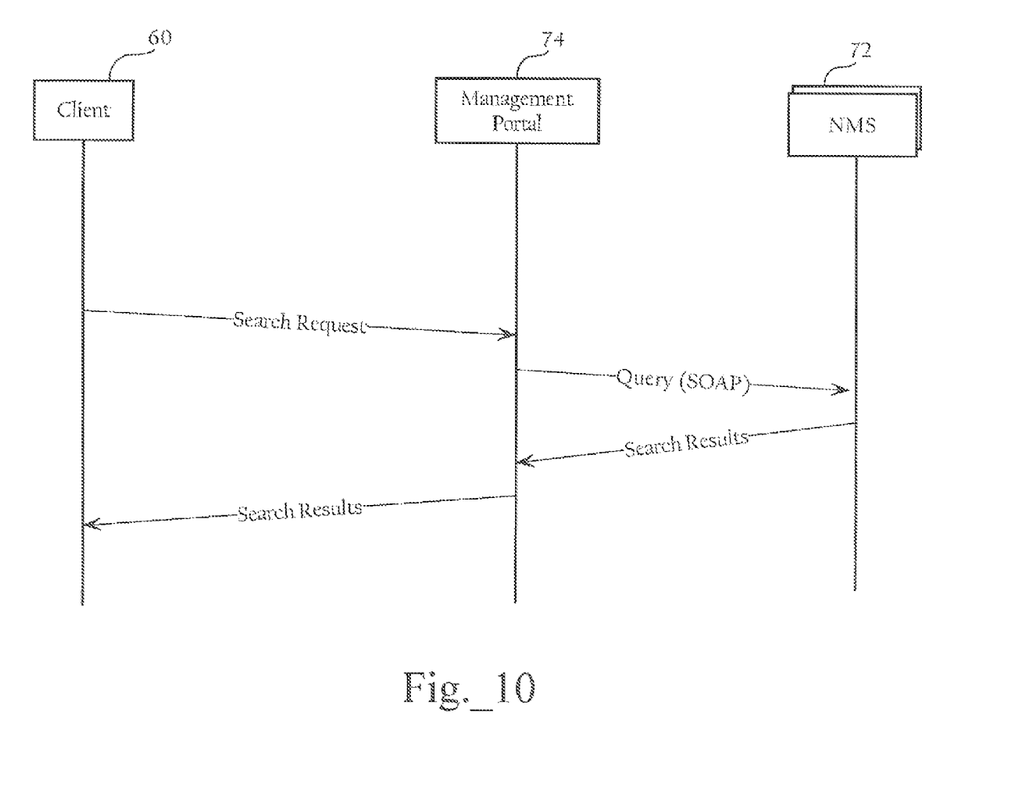
FIG. 10 is a diagram illustrating an example information flow among a client, a management portal, and one or more NMSs, and is directed to performing a search.
Figure 11:
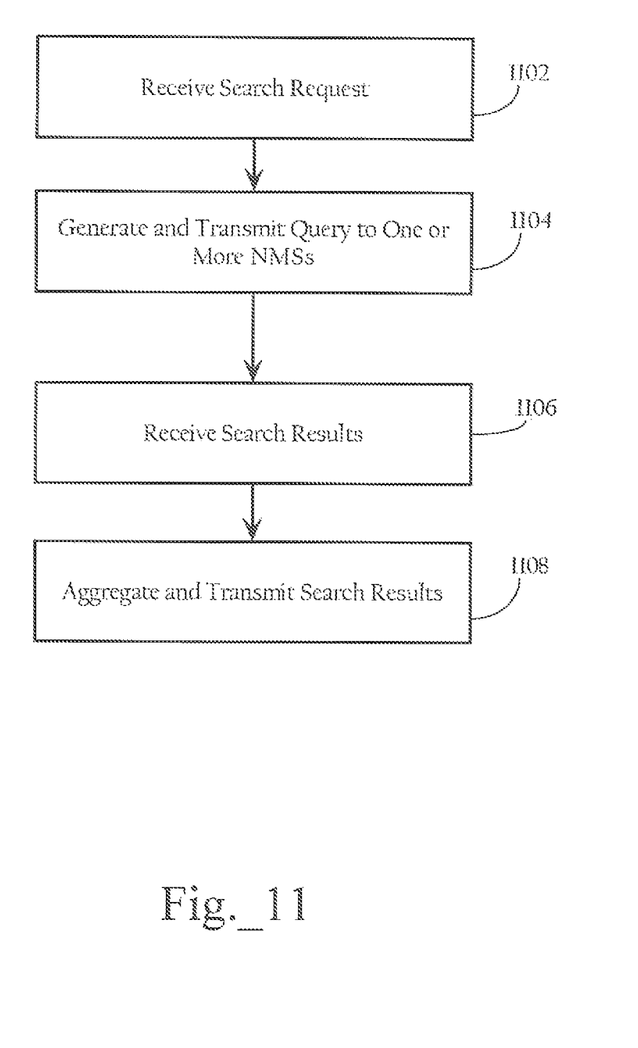
FIG. 11 illustrates an example method implemented at a management portal and associated with performing a search.

FIG. 10 is a diagram illustrating an example information flow among a client 60, a management portal 74, and one or more NMSs 72, and is directed to performing a search. FIG. 11 illustrates an example method implemented at a management portal and associated with performing a search. Referring to both FIGS. 10 and 11, when the user clicks on a search command, the client 60 sends a search request to the management portal 74. When the management portal 74 receives the search request (1102), the management portal 74 generates query and sends a query to one or more of the NMSs 72 (1104). When the management portal 74 receives the search results from the one or more NMSs 72 (1106), the management portal 74 aggregates and sends the search results to the client 60 (1108).

Figure 12:
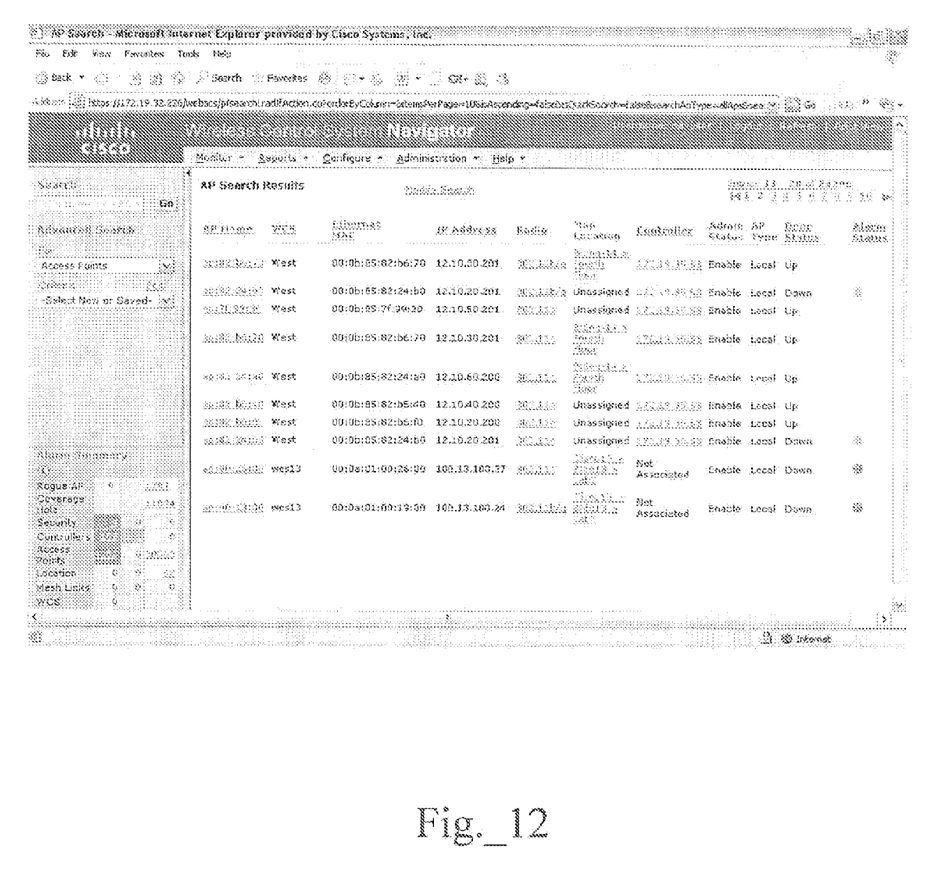
FIG. 12 illustrates an implementation of an example user interface showing search results.

FIG. 12 illustrates an implementation of an example user interface showing search results. From the management portal home page, the user may click on a search item (search result) to get redirected to a detailed page of that item on the NMS 72 where the search item was found on. Note that whether the user clicks on the search results in the management portal home page or in the NMS home page, the client 60 receives the same information.

In one implementation, there may be multiple distributed management portals, where a given NMS may accept current sessions with two or more management portals. As such, a given NMS may be managed simultaneously by multiple management portals. If managed by multiple management portals, the NMS would know which portal to authenticate during a redirect process since the appropriate identifying information (e.g., Session ID, IP address, etc.) is passed in along with the ticket.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic encoded in one or more non-transitory computer-readable media for execution and when executed operable to:
    prelog, at a management portal, into one or more network management servers to establish persistent sessions with the one or more network management servers for the exchange of management data between the management portal and respective network management servers, wherein each persistent session is identified by a session identifier;
    perform, at the management portal, periodic processes to prevent each persistent session from expiring;
    authenticate, at the management portal, one or more clients requesting access;
    receive, from a client, a first request to access a selected network management server of the one or more network management servers;
    generate a ticket for the client;
    transmit a redirection message from the management portal to the client, wherein the redirection message identifies the selected network management server and includes the ticket and the session identifier corresponding to the selected network management server, and wherein the redirection message is operative to cause the client to transmit a second request directly to the selected network management server, the second request including the ticket and the session identifier;
    receive the ticket from the selected network management server;
    validate the ticket; and
    transmit a validation message to the selected network management server.

2. The logic of claim 1 wherein the logic is further operable to periodically obtain summary data from one or more of the network management servers.

3. The logic of claim 1 wherein the logic is further operable to:
    receive a search request from a client;
    query the one or more network management servers based on the search request; and
    transmit, to the client, a search results page including one or more search results retrieved from one or more of the network management servers.

4. The logic of claim 3 wherein the search results page includes one or more hypertext links that, when activated, are operative to redirect the client to a network management server.

5. The logic of claim 1 wherein the logic is further operable to:
    obtain summary data from the one or more network management servers over respective persistent sessions; and
    responsive to a successful login, transmit the summary data to the client in a network management page.

6. A method comprising:
    prelogging, at a management portal, into one or more network management servers to establish persistent sessions with the one or more network management servers for the exchange of management data between the management portal and respective network management servers, wherein each persistent session is identified by a session identifier;
    performing, at the management portal, periodic processes to prevent each persistent session from expiring;
    authenticating, at the management portal, one or more clients requesting access;
    receiving, from a client, a first request to access a selected network management server of the one or more network management servers;
    generating a ticket for the client;
    transmitting a redirection message from the management portal to the client, wherein the redirection message identifies the selected network management server and includes the ticket and the session identifier corresponding to the selected network management server, and wherein the redirection message is operative to cause the client to transmit a second request directly to the selected network management server, the second request including the ticket and the session identifier;

receiving the ticket from the selected network management server;

validate the ticket; and transmitting a validation response with a user role defining one or more access privileges to the selected network management server.

7. The method of claim 6 further comprising periodically obtaining summary data from one or more of the network management servers.

8. The method of claim 6 further comprising:

receiving a search request from a client;

querying the one or more network management servers based on the search request; and transmitting, to the client, a search results page including one or more search results retrieved from one or more of the network management servers.

9. The method of claim 8 wherein the search results page includes one or more hypertext links that, when activated, are operative to redirect the client to a network management server.

10. The method of claim 6 further comprising:

obtaining summary data from the one or more network management servers over respective persistent sessions; and responsive to a successful login, transmitting the summary data to the client in a network management page.

11. Logic encoded in one or more non-transitory computer-readable media for execution and when executed operable to:

receive, at a network management server, a prelogging communication by one or more management portals to establish respective persistent sessions with the one or more management portals;

authenticate, at the network management server, the one or more management portals;

maintain, at the network management server, respective persistent sessions with the one or more authenticated management portals for the exchange of management data between the network management server and respective management portals, wherein each persistent session is identified by a session identifier;

receive, at the network management server, respective periodic processes performed by the one or management portals to prevent the respective persistent sessions from expiring;

receive, at the network management server from a client, a request including a session identifier and a ticket;

select a management portal based on the session identifier corresponding to the persistent session with the respective network management server and transmit the ticket to the selected management portal for validation; and establish, at the network management server, a session directly with the client responsive to an indication of validation of the ticket.

12. The logic of claim 11 wherein the logic is further operable to:

receive one or more validation responses with a user role defining one or more access privileges; and enforce the user role relative to requests received from the client.

13. A method comprising:

receiving, at a network management server, a prelogging communication by one or more management portals to establish respective persistent sessions with the one or more management portals;

authenticating, at the network management server, the one or more management portals;

maintaining, at the network management server, the respective persistent sessions with the one or more authenticated management portals for the exchange of management data between the network management server and respective management portals, wherein each persistent session is identified by a session identifier;

receiving, at the network management server, respective periodic processes performed by the one or management portals to prevent the respective persistent sessions from expiring;

receiving, at the network management server from a client, a request including a session identifier and a ticket;

selecting a management portal based on the session identifier corresponding to the persistent session with the respective network management server and transmit the ticket to the selected management portal for validation; and establishing, at the network management server, a session directly with the client responsive to an indication of validation of the ticket.

14. The method of claim 13 further comprising:

receiving one or more validation responses with a user role defining one or more access privileges; and enforcing the user role relative to requests received from the client.

15. A system comprising:

one or more management portals operative to establish a persistent session with one or more network management servers, by prelogging into each network management server, for the exchange of management data between the management portal and respective network management servers, wherein each persistent session is prevented from expiring by a periodic process performed by the management portal and identified by a session identifier; authenticate one or more clients requesting access; receive, from a client, a first request to access a selected network management server of the one or more network management servers; generate a ticket for the client; and transmit a redirection message to the client, wherein the redirection message identifies the selected network management server and includes the ticket and the session identifier corresponding to the selected network management server, and wherein the redirection message is operative to cause the client to transmit a second request directly to the selected network management server, the second request including the ticket and the session identifier; and one or more network management servers operative to authenticate one or more management portals; maintain respective persistent sessions with one or more authenticated management portals, wherein each persistent session has a session identifier; receive, from a client, a request including a session identifier and a ticket; select a management portal based on the session identifier corresponding to the persistent session with the respective network management server and transmit the ticket to the selected management portal for validation; and establish a session directly with the client responsive to an indication of validation of the ticket;

wherein the one or more management portals are each operative to:
  receive the ticket from the selected network management server;
  validate the ticket; and
  transmit a validation message to the selected network management server.

16. The system of claim 15 wherein the one or more network management servers are further operative to
  receive one or more validation responses with a user role defining one or more access privileges; and
  enforce the user role relative to requests received from the client.

17. The system of claim 15 wherein the one or more management portals are each operative to:
  receive a search request from a client;
  query the one or more network management servers based on the search request; and
  transmit, to the client, a search results page including one or more search results retrieved from one or more of the network management servers.

18. The system of claim 15 wherein the one or more management portals are each operative to:
  obtain summary data from the one or more network management servers over respective persistent sessions; and
  responsive to a successful login, transmit the summary data to the client in a network management page.

* * * * *